United States Patent [19]

Virag

[11] Patent Number: 4,762,056
[45] Date of Patent: Aug. 9, 1988

[54] COMBINED PACKAGE AND COOKING CONTAINER

[76] Inventor: Janos Virag, P.O. Box 6568, Nassau, The Bahamas

[21] Appl. No.: 916,322

[22] Filed: Oct. 7, 1986

[51] Int. Cl.⁴ ............................................. B65B 25/22
[52] U.S. Cl. ..................................... 99/345; 426/394; 426/412; 426/523
[58] Field of Search ............... 426/113, 412, 523, 112, 426/115, 324, 325; 99/345–347, 449

[56] References Cited

U.S. PATENT DOCUMENTS

| | | | |
|---|---|---|---|
| 3,659,584 | 5/1972 | Doyle et al. | 426/113 |
| 3,713,378 | 1/1973 | West et al. | 426/132 |
| 4,172,903 | 10/1979 | Daswick | 426/113 |
| 4,299,851 | 11/1981 | Lowe | 426/113 |

FOREIGN PATENT DOCUMENTS 2915038 10/1979 Fed. Rep. of Germany ...... 426/113

*Primary Examiner*—Barry S. Richman
*Assistant Examiner*—William R. Johnson
*Attorney, Agent, or Firm*—John Cyril Malloy

[57] ABSTRACT

A container assembly used for the storage of food products plus additives such as spices, etc. therefor, wherein the additives are stored in segregated relation to one another and the food product. The container assembly is designed for the storage of the food product such as by freezing and also for the cooking of the food product in a manner which facilitates the automatic and selective mixing of the additives with the food product wherein the food product and additives may be stored for prolonged periods prior to cooking and user of the device need not come into direct contact with the food product until it is ready for consumption.

14 Claims, 3 Drawing Sheets

COMBINED PACKAGE AND COOKING CONTAINER

BACKGROUND OF THE INVENTION

1. Field of the Invention

This invention relates to a combined package and/or storage container and a device utilized in the cooking of the food product in a manner which automatically adds predetermined additives such as spices in preselected amounts to the food product during the cooking process wherein the package and contained food products may be taken directly from a storage facility, such as a freezer, and placed in a cooking utensil for heating and cooking thereof.

2. Description of the Prior Art

Container and packages used for the storage and subsequent cooking of food products are of course well known in the art. Such devices which allow prolonged storage as well as facilitate cooking of the product are particularly popular in today's modern rapid paced society. The sophistication of prior art devices of this type even provide for the addition or regulation of flavoring to the food products being cooked as well as providing the substantially concurrent cooking of different portions of the same food product or meal.

The following U.S. Patents are representative of relatively modern advances in the prior art relating to the above set forth subject matter and include the patents U.S. Pat. Nos. 3,881,094 to Rogers et al; 4,133,896 Standing et al; 4,143,165 Daswick; 4,154,860 Daswick; 4,172,903 Daswick; and 4,299,851 Lowe. Of the above, the Daswick patents show the adding of condiment to the food product during the cooking process and the heating of one product serving to aid in the heating of an adjacently packaged product through the passage of heated or pressurized gases. Also, the patent to Lowe shows a flavoring dispenser which may be added to cooking food.

It is readily apparent therefore that the prior art structures directed to both storage and subsequent cooking as well as the additions of condiments, flavorings, juices, gravies, etc. which are added to cooking products in order to increase the overall flavoring or desirability thereof are well known. However, the prior art still appears to be absent any type of selective seasoning in terms of adding one or all of a variety of additives, including spices, flavorings, juices, gravies, etc. to a food product, during the cooking thereof. Such additives or flavorings could be added in preselected and regulated amounts during the entire cooking process so as to expose the food product to the desired additives for a prolonged period. Also, this could be accomplished automatically without need of constant care or adjustment by the user of the device. In addition to the above, a preferred device, container or package should also be specifically structured to serve as a storage container and/or ultimate retail packaging of the subject food product and additives and therefore be relatively condensed in size and shape while at the same time providing an attractive and more importantly functional product to accomplish the intended result.

SUMMARY OF THE INVENTION

A container assembly of the present invention includes a base generally formed of a rigid material structured to at least partially support the subject assembly, in a manner to be described in greater detail hereinafter, and a depending pouch itself formed of a flexible or more specifically, expandable material which could include, but is not limited to, a metal foil or wire material. The depending pouch holds the primary food product in communicating relation with a hollow interior of the base. Such hollow interior is primarily defined by a chamber having an open mouth designed to cooperate with a closure structure such that cooking liquid, such as water, may be added to the interior of the chamber.

By means of a first path of fluid flow, the cooking liquid may pass into the interior of the pouch and effectively "baste" the food product on the interior thereof.

Another important feature of the present invention is the provision of a compartment means formed within the base wherein the compartment means are specifically structured to house a plurality of additives therein. Such additives may be in the form of spices, condiments, gravies, etc. In order to preselect the amount of additives to be added to the food product, the compartment means is divided into a plurality of compartments wherein each compartment is divided into a plurality of segments. The segments are structured so as to communicate with the interior of the chamber and the cooking liquid therein by a second path of fluid flow. Seal means are provided to selectively open or remain closed certain ones of a plurality of apertures which define the second path of fluid flow such that all or a fraction of the additives, such as spices, may be allowed to flow onto the contained food product within the pouch during the cooking process.

A third path of fluid flow is temporarily closed by the specific structure of the pouch or other blocking means but may be opened upon a build-up of fluid pressure within the pouch due to a cooking of the food product and the heating of the cooking liquid to vapor. Such a build-up of pressure releases any type of blocking closure defining a third path of fluid flow and the steam or pressurized vapor passes through and along the third path of fluid flow into a rear opening of each of the segments of the compartments such that the additives or spices contained therein are effectively fed through the apertures defining the second path of fluid flow into the chamber and again back onto the primary food product contained within the pouch.

It is readily seen therefore, that a continuing closed path of travel is effectively defined by the cooking liquid and contained additives dripping or passing slowly onto the primary food product; a heating of the cooking liquid and a rising of the juices and vapors from the food product containing at least a partially pressurized atmosphere which then allows the cooking vapors to pass along a third path of fluid flow into the compartment segments with the additives, wherein the additives are then forced into the centrally disposed chamber and the condensed gases or vapors flow along therewith and subsequently again onto the food product within the pouch.

Accordingly, it is apparent that the structure of the present invention allows for a continuous basting and "supply" of both cooking liquid and additives, in preselected amounts, during the entire cooking process wherein the liquid, in the form of pressurized vapor, etc., is "recycled" and the food product is constantly exposed to both the additives and the cooking liquid resulting in a moist, flavorful product, when the cooking process is completed.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
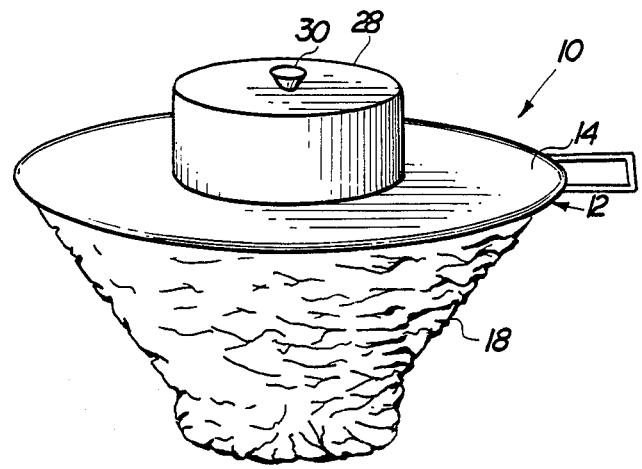
FIG. 1 is an isometric view of the container assembly of the present invention shown in a state capable of storage of a food product.
Figure 2:
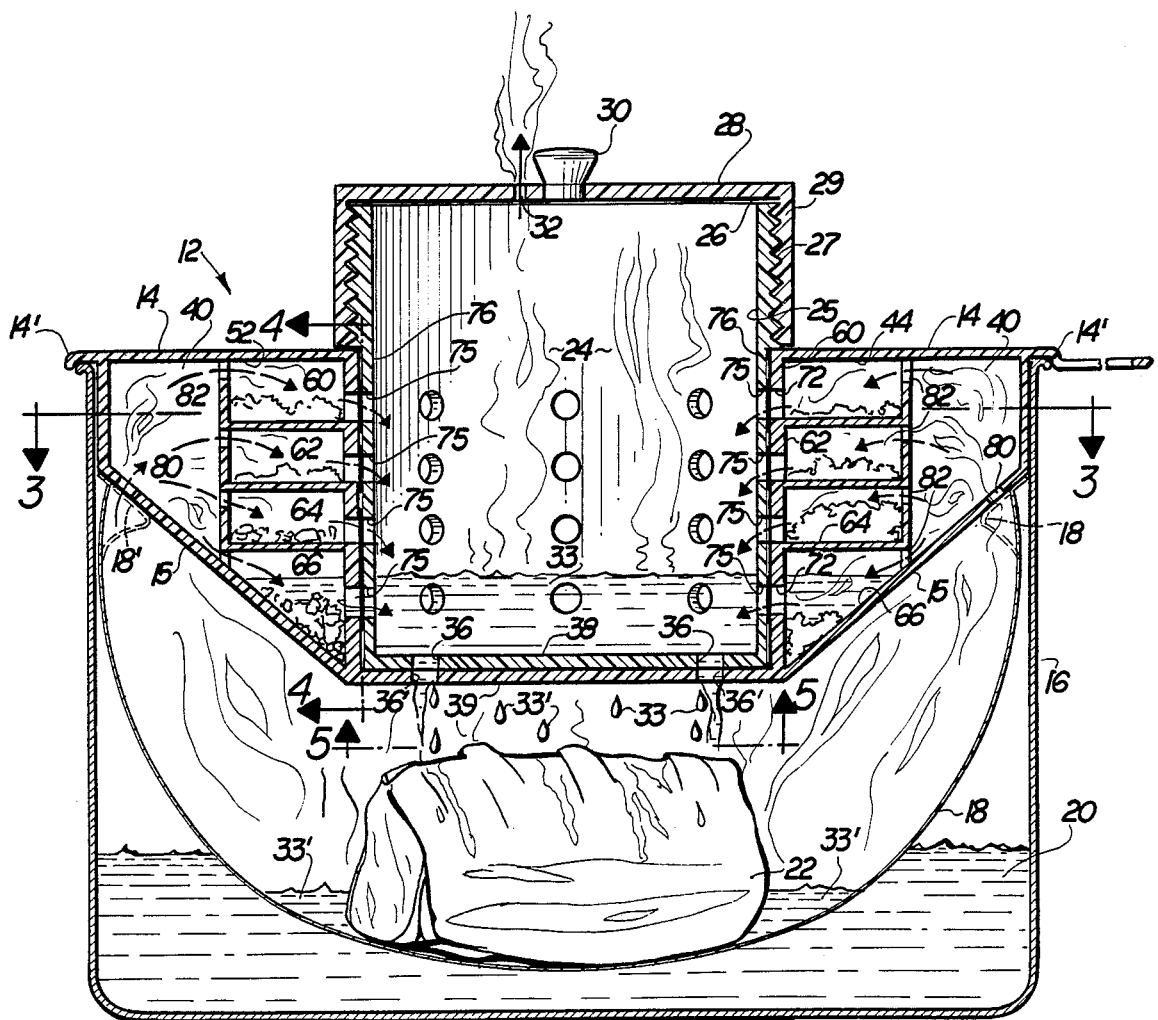
FIG. 2 is a sectional view showing the interior structural features and location of the food product therein.

As shown in FIG. 1, the container assembly of the present invention is generally indicated as 10 and includes a base 12 generally made of rigid material of sufficient strength to support the assembly by an uppermost flange 14, generally about the periphery thereof as at 14′, supported on the upper surrounding peripheral rim of a cooking container or pot 16 as shown in FIG. 2. Also, an extending support 15 is secured to the uppermost flange 14 and may extend outwardly therefrom so as to accommodate the support of the base 12 on the peripheral rim of pots or kettles of a larger size than that represented in FIG. 2. It should further be noted that the outward extension 15 may be a part of the flange 14 or otherwise structured to be collapsible relative thereto to facilitate storage and packaging of the base 12 prior to use. In addition, the container assembly includes a pouch 18 formed from a flexible or more specifically an expandable material which is water resistant, such as foil or the like, wherein the pouch 18 may be disposed on the interior of the cooking vessel 16 and subjected to water or like liquid contained therein 20 for the direct heating of the pouch 18 and the food product and/or contents 22 contained therein.

The base 12 is structured to have at least a partial hollow interior portion defined by a centrally disposed chamber 24. The chamber has an open mouth 26 disposed at one end thereof wherein the open mouth 26 is capable of being closed or covered by a closure means 28. The chamber 24 is further defined by a chamber receptacle 25 protruding upwardly from the outer flange or exposed portion 14. This outer protrusion extends the dimension or capacity of the chamber 24 and in addition, provides an external threaded surface 27 to which the closure 28 may be connected as by an internally threaded depending cylindrical wall 29.

The closure means 28 has a knob or handle member 30 protruding outwardly from an exposed portion thereof and further a vent means or vent aperture 32 is provided to allow escape of a build-up of fluid pressure within the chamber 24 as will be explained in greater detail hereinafter. It should be apparent that removal of the cover means 28 from its threaded connection 27 at side wall 29 with the upward extension of the chamber vessel 25 allows for access to the interior of the chamber 24 and the placement of a cooking liquid, such as water, juices, gravies, etc., as at 33 therein.

Figure 3:
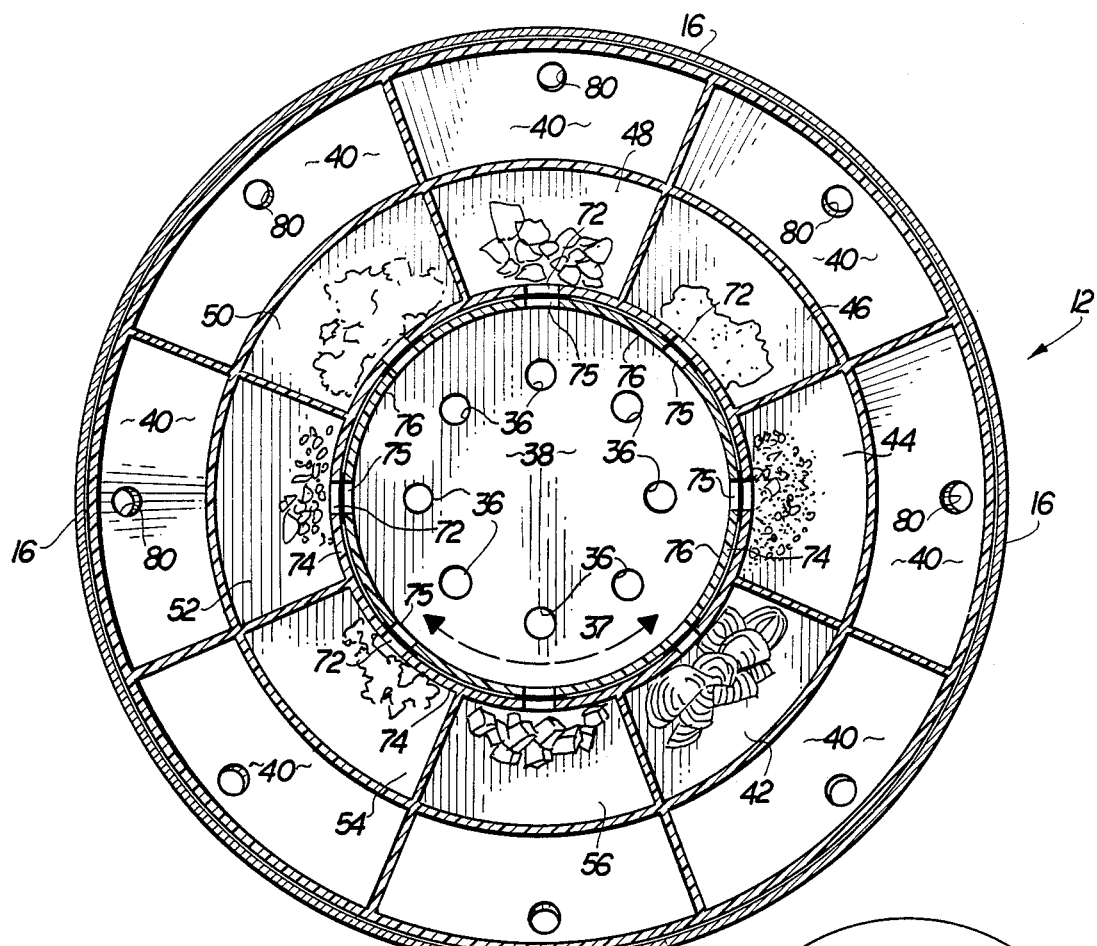
FIG. 3 is a sectional view along line 3—3 of FIG. 2 showing additional structural features on the interior of the container assembly.
Figure 5:
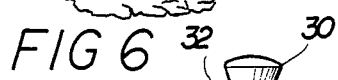
FIG. 5 is an end view along line 5—5 of FIG. 2.

The cooking liquid 33 is allowed to drip or pass slowly onto the food product 22 through one or more apertures 36 defining a first path of fluid flow between the interior chamber 24 and the interior of the pouch 18 and of course food product 22. The apertures 36 allow the cooking fluid 33 to pass in a regulated fashion as by drops 33′ and collect within the pouch in surrounding or engaging relation to the food product 22. The regulation of flow of the cooking liquid 33 may be accomplished by varying the relative positions between apertures 36′ (see FIGS. 5 and 8) formed in the floor 39 of the base which supports a bottom 38 of the vessel 25. In that vessel 25 can be rotated relative to floor 39, the positions of apertures 36 and 36′ may vary and of course be reduced to allow only a minimal amount of liquid to drip down as at 33′ onto the food product 22. See directional arrows 37 in FIG. 3 showing relative rotation of the bottom 38 of the chamber 25 relative to the floor 29.

The base of the assembly further includes an under portion 15 extending downwardly from the upper flange portion 14 in fixed or integral relation to the floor 39 of the base which is supporting the bottom 38 of the chamber 25. Further, the bottom portion 15 extends continuously around and at least partially defines an additional hollow interior portion of the base including a plurality of collecting chambers 40 disposed on the outside of but in communication with a plurality of compartments 42, 44, 46, 48, 50 52, 54 and 56. As shown in FIGS. 2 and 3, each of the compartments are divided into a plurality of compartment segments including an uppermost segment 60, a first and second middle segment 62 and 64 respectively, and a bottom-most segment 66. Each of the compartments 42 through 56 is specifically structured to hold a specific additive such as a spice, flavor, condiment, etc. therein. In addition, since each of the compartments are divided into compartment segments, the spice or additive in each compartment may be equally divided into equal portions wherein each compartment segment contains an equal portion. This permits regulation of the amount of additive to be delivered or forced into the central chamber 44 for mixing with the cooking liquid 33 and eventual delivery and/or basting of the food product 22.

Figure 4:
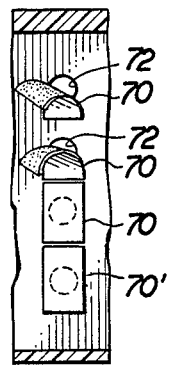
FIG. 4 is a sectional view along line 4—4 of FIG. 2.

With reference to FIG. 4, a plurality of seal means 70 are provided in covering relation to each of a plurality of apertures 72 disposed in the cylindrical wall 74 of the base wherein such cylindrical wall 74 is disposed in surrounding relation with the cylindrical side wall 76 of chamber 25. In addition, it is readily apparent that each of the apertures 72 (FIG. 4) may be arranged in mating, communicating relation with similarly disposed apertures 75 in the cylindrical side wall 76.

Accordingly, operation of the device is as follows: Liquid 33 is added to the central chamber 24 after removal of closure 28. This liquid passes down and effectively bastes the food product 22 within pouch 18 as represented as 33'. Passage of the cooking liquid 33 onto the food product 22 is regulated to a slow drip flow by orienting floor 39 and bottom 38 of the base and of the vessel 25 respectively so that only a minimal amount of liquid 33' passes therethrough. These apertures 36 and 36' accordingly define a path of first fluid flow. A path of second fluid flow is defined by the aligned apertures 72 and 75 respectively formed in the cylindrical wall 74 of the base disposed in surrounding relation to the cylindrical side wall 76 of the vessel 25 (see FIG. 3). Through these apertures 72, 75 defining the path of second fluid flow, the additives or spices, etc. pass therethrough as indicated by directional arrows shown leading into the central chamber 24. As set forth above and with reference to FIG. 4, removal of the sealing element 70 determines how much of the spice or additive is allowed to flow into the central chamber 24 and cooking liquid 33. Removal of all the sealing elements 70 would allow the full quantity of additive to be supplied to the chamber 24 contained in each of the compartment segments 60, 62, 64, and 66. However, removal of, for instance, the lowermost sealing structure 70' (FIG. 4) will enable only the contained quantity to pass through the respective apertures 72 and 75 since only compartment segment 66 is in communication with the interior chamber 24.

A third path of fluid flow is defined by apertures 80 formed in the depending bottom walls 15 of the base and communicating apertures 82 formed in communicating relation with the various compartment segments 60 through 66. It is readily apparent therefore that aperture 80 allows the vapors or gases to pass into the collection chamber 40 and into the various compartment segments 60 through 66 depending upon which of the seal structures 70 and 70' are removed. Passing of the vapors into the various compartment segments will serve to feed or force out the additives in the respective compartment segments into the central chamber 24 so as to mix with the cooking liquid 33 and pass onto the food product 22. Initially, the apertures 80 are sealed by correspondingly positioned peripheral portions of foil 18 as at 18'. However, the build-up of vapor or fluid pressure within the interior of the pouch 18 forces away this peripheral portion 18' and leaves open the various apertures 80 leading to this respective collection chamber 40.

It can be readily seen in FIG. 2 that once the heating liquid 20 is placed on an appropriate burner or heating element 90, the liquid will heat up causing the pouch 18 to expand and fluid pressure, through vapors, to build-up on the interior thereof. The various apertures of the first, second, and third fluid flow paths are open thereby setting the entire container into process and causing an automatic and continuous basting or placement of the additives onto the food product 22.

Figure 6:
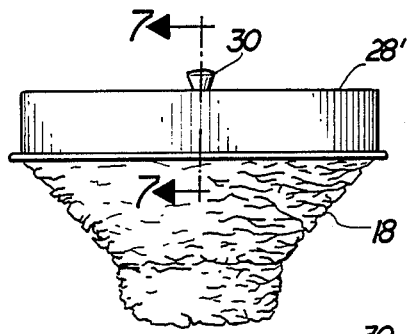
FIG. 6 is a side view of another embodiment of the container assembly.
Figure 7:
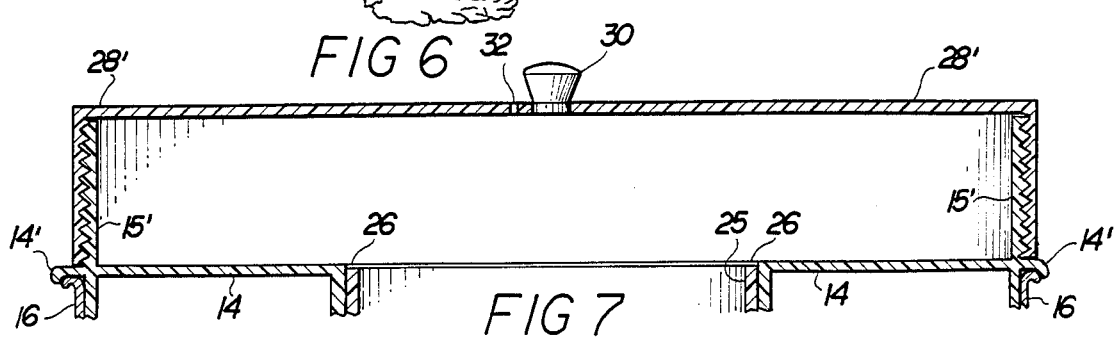
FIG. 7 is a sectional view along line 7—7 of FIG. 6 showing another embodiment of a closure assembly for the embodiment of the container assembly of FIG. 6.

In FIGS. 6 and 7, a varying embodiment of the present invention is provided wherein the closure element 28' extends over the entire outwardly extending flange 14 and is threadedly engaged at upstanding flange segments 15' as shown. In addition, the vent 32 is provided in the uppermost wall portion of the closure means 28' for the venting of excess pressure therefrom.

Figure 8:
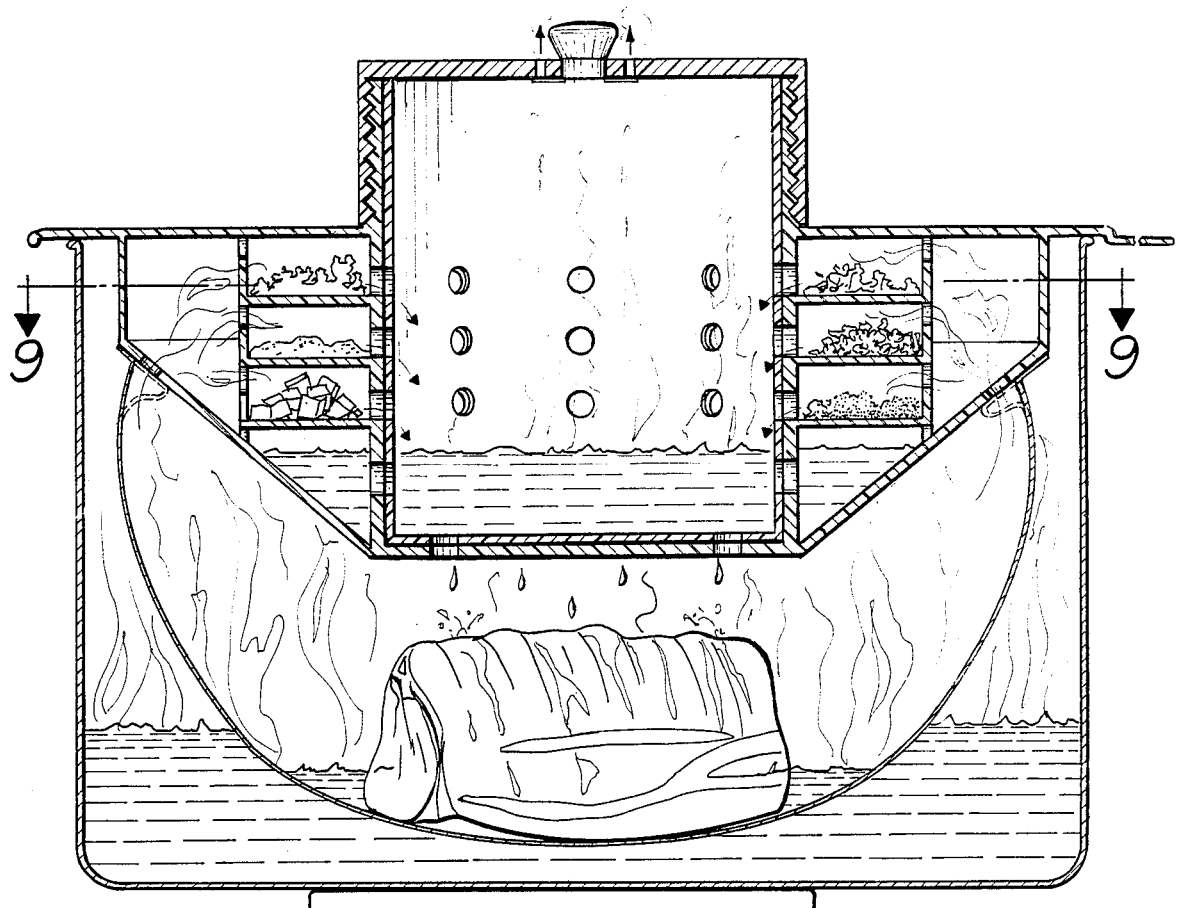
FIG. 8 is a sectional view of another embodiment of the structure of the container assembly.
Figure 9:
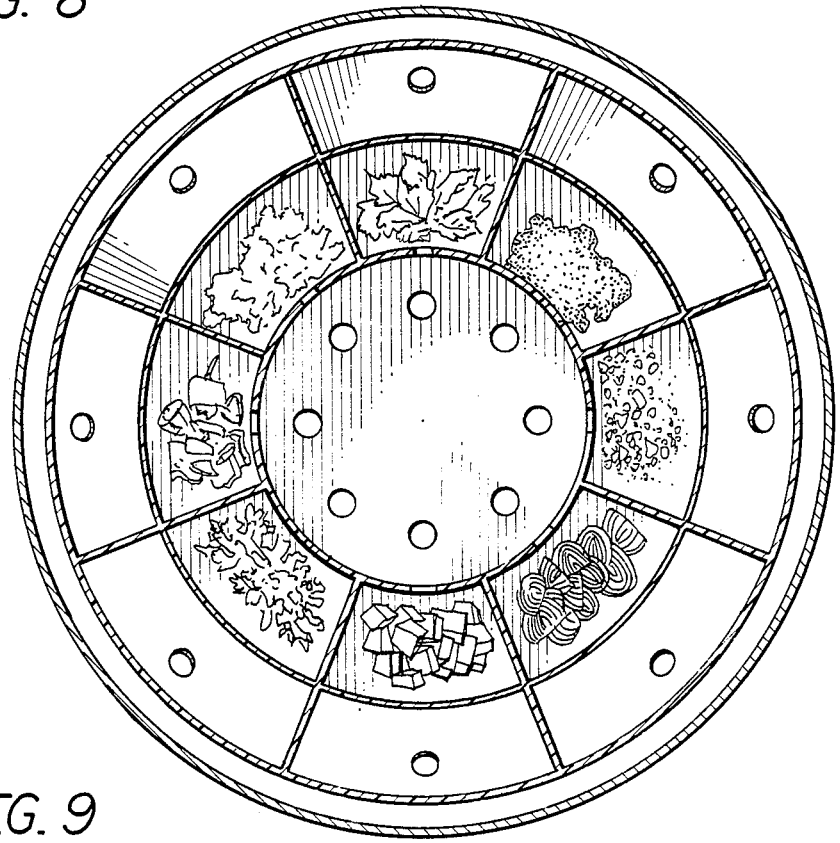
FIG. 9 is a sectional view along line 9—9 of FIG. 8.

With reference to FIGS. 8 and 9, the structure and use or operation of the assembly is the same as the embodiment of FIGS. 2 and 3 with the exception that the cylindrical side wall 74 of the base surrounding the cylindrical side wall 75 of container 25 has an upward extension as at 74' which is externally threaded as at 27 for mating threaded engagement with the side wall 29 of the closure 28. This differs from the embodiment of FIG. 2 in that the upward extension or extremity of the cylindrical side wall 75 of container 25 is not in threaded engagement but may be removed totally from its position as shown in FIG. 8. Also, upward movement or travel of the container 25 is prevented due to the closure 28 being threadedly secured to the upward extension 74' as shown in FIG. 8.

It is therefore to be understood that the following claims are intended to cover all of the generic and specific features of the invention herein described, and all statements of the scope of the invention which as a matter of language, might be said to fall therebetween.

Now that the invention has been described,

What is claimed is:

1. A container assembly of the type primarily designed for the containment of a food product and additives therefor during both storage and cooking of the food product, said assembly comprising:
    (a) a base comprising means defining a substantially hollow interior portion and including a closure secured to said base in covering relation to at least a portion of said hollow interior,
    (b) a pouch secured to said base in depending, substantially enclosing relation to an underportion thereof,
    (c) said pouch structured to contain a food product and disposed in fluid receiving relation to at least a part of said hollow interior portion of said base,
    (d) compartment means for containing food additives mounted on said base and structured to selectively communicate with said hollow interior portion,
    (e) said compartment means further disposed for fluid communication with fluid within said pouch and disposed substantially between said pouch and said hollow interior portion,
    (f) a first path of fluid flow formed in said base and disposed to provide liquid flow from said hollow interior portion into said pouch,
    (g) a second path of fluid flow formed on said base and disposed to provide fluid flow from said pouch into said compartment means and a third path of fluid flow formed on said base adjacent said compartment means and disposed and structured to provide fluid flow from said compartment means into said hollow interior portion,
    (i) whereby a cooking liquid placed in said hollow interior portion recirculates throughout said pouch and said base and feeds additives from said compartment means to said pouch.

2. An assembly as in claim 1 wherein said base is formed of a substantially rigid material and said closure is disposed in removable attachment to said base in closing position over an open end of said hollow interior portion.

3. An assembly as in claim 2 wherein said closure comprises a vent portion formed therein in fluid communication with said hollow interior portion whereby excess fluid pressure within said hollow interior portion may be vented to the exterior of the container assembly.

4. An assembly as in claim 1 wherein said hollow interior portion is defined by a substantially centrally disposed chamber including a floor portion disposed at a lower end thereof, a wall portion disposed in surrounding relation to said floor portion and an open mouth oppositely disposed to said floor portion and establishing communication with the exterior of the container assembly.

5. An assembly as in claim 4 wherein said closure is removably securable over said open mouth and in closing relation to said chamber, said chamber structured to receive cooking liquid upon removal of said closure.

6. An assembly as in claim 5 wherein said first path of fluid flow is formed in said floor portion and comprises a first aperture means disposed and structured for passage of cooking liquid thereto into said pouch.

7. An assembly as in claim 5 wherein said compartment means comprises a plurality of compartments collectively disposed in surrounding relation to said chamber, each of said compartments structured to contain additives which are disposed in communicating relation with said chamber.

8. An assembly as in claim 7 wherein said second path of fluid flow comprises a second aperture means formed in each of said compartments and in corresponding parts of said wall portion and structured for fluid flow between said compartments and said chamber and passage of additives into said chamber.

9. An assembly as in claim 8 further comprising seal means removably covering said second aperture means for regulating flow of fluid and additives therethrough.

10. An assembly as in claim 9 wherein each of said compartments comprises a plurality of segments each disposed and structured to contain an amount of additive.

11. An assembly as in claim 10 wherein said second aperture means comprises a plurality of apertures formed in said compartment each of which is disposed in communication with one of said plurality of compartment segments.

12. An assembly a in claim 11 further comprising seal means removably covering said plurality of apertures for regulating flow of fluid and additives therethrough.

13. An assembly as in claim 12 wherein said pouch is formed of a substantially flexible, heat resistant material secured about its periphery to said base, a position of said pouch initially disposed in overlying, sealing engagement with said third path of fluid flow, whereby fluid flow is prevented therethrough.

14. An assembly as in claim 13 wherein said portion of said pouch is structured for removal from said sealing engagement with said third path of fluid flow upon a build-up of fluid pressure within said pouch.

* * * * *